US 8,451,168 B2

(12) United States Patent
Henkel et al.

(10) Patent No.: US 8,451,168 B2
(45) Date of Patent: May 28, 2013

(54) METHOD FOR DETERMINING BIASES OF SATELLITE SIGNALS

(75) Inventors: Patrick Henkel, Emmering (DE); Zhibo Wen, Munich (DE); Christoph Guenther, Wessling (DE)

(73) Assignee: DLR Deutsches Zentrum für Luft- und Raumfahrt e.V. (DE)

( * ) Notice: Subject to any disclaimer, the term of this patent is extended or adjusted under 35 U.S.C. 154(b) by 100 days.

(21) Appl. No.: 12/964,559

(22) Filed: Dec. 9, 2010

(65) Prior Publication Data
US 2011/0140958 A1 Jun. 16, 2011

(30) Foreign Application Priority Data
Dec. 9, 2009 (EP) .................................... 09178573

(51) Int. Cl.
*G01S 19/07* (2010.01)
(52) U.S. Cl.
USPC .................................................... 342/357.44
(58) Field of Classification Search
USPC .................................................... 342/357.44
See application file for complete search history.

(56) References Cited

U.S. PATENT DOCUMENTS

| 2009/0184869 | A1 | 7/2009 | Talbot et al. | |
| 2010/0188285 | A1* | 7/2010 | Collins | 342/357.04 |

FOREIGN PATENT DOCUMENTS

FR 2914430 A1 10/2008

OTHER PUBLICATIONS

Blewitt, G.: "An Automatic Editing Algorithm for GPS Data", Geophysical Research Letters, vol. 17, No. 3, Mar. 1990, pp. 199-202.
European Search Report; Application No. EP 09 17 8573; Jul. 1, 2010; 8 pages.
Sardon, E., Rius, A., Zarraoa, N.: "Estimation of the transmitter and receiver differential biases and the ionospheric total electron content from Global Positioning System observations", Radio Science, vol. 29, No. 3, 1994, pp. 577-586.
G. Wübbena: "GPS carrier phases and clock modeling, Lecture Notes in Earth Sciences": GPS-Techniques Applied to Geodesy and Surveying, vol. 19, pp. 381-392, DOI: 10.1007/BFb0011350, 1988.
D. Laurichesse and F. Mercier: "Integer ambiguity resolution on undifferenced GPS phase measurements and its application to PPP", Proc. of ION-GNSS, Forth Worth, USA, pp. 135-149, Sep. 2007.
P. Teunissen: "Integer estimation in the presence of biases, Journal of Geodesy", vol. 75, pp. 399-407, 2001.

(Continued)

Primary Examiner — Harry Liu
(74) Attorney, Agent, or Firm — St. Onge Steward Johnston & Reens LLC

(57) ABSTRACT

A new method for bias estimation on multiple frequencies with a Kalman filter is proposed. It consists of four steps: First, a least-squares estimation of ranges, ionospheric delays, ambiguities, receiver phase biases and satellite phase biases is performed. The code biases are absorbed in the ranges and ionospheric delays, and a subset of ambiguities is mapped to the phase biases to remove linear dependencies between the unknown parameters. In a second step, the accuracy of the bias estimates is efficiently improved by a Kalman filter. The real-valued a posteriori ambiguity estimates are decorrelated by an integer ambiguity transformation to reduce the time of ambiguity resolution. Once the float ambiguities have sufficiently converged, they are fixed sequentially in a third step. Finally, a second Kalman filter is used to separate the receiver and satellite code biases and the tropospheric delays from the ranges.

18 Claims, 8 Drawing Sheets

OTHER PUBLICATIONS

R. Brown and P. Hwang: "Introduction to random signals and applied Kalman filtering", 3rd edition, John Wiley & Sons, New York, 1997.

B. Arbesser-Rastburg: "Ionospheric corrections for satellite navigation using EGNOS", Proc. of XXVII-th URSI General Assembly, Maastricht, 2002.

P. Henkel, V. Gomez and C. Günther: "Modified LAMBDA for absolute carrier phase positioning in the presence of biases", Proc. of Intern. Technical Meeting (ITM), Anaheim, USA, pp. 642-651, Jan. 2009.

P. Henkel and C. Günther: "Reliable Carrier Phase Positioning with Multi-Frequency Code Carrier Linear Combinations", Proc. of 23rd Intern. Techn. Meet.of the Inst. of Nav. (ION-GNSS), Portland, USA, Sep. 2010.

M. Ge, G. Gendt, M. Rothacher, C. Shi and J. Liu: "Resolution of GPS carrier-phase ambiguities in Precise Point Positioning (PPP) with daily observations", Journal of Geodesy, Springer, pp. 389-399, Oct. 2007.

Banville, S., et al.: "Satellite and Receiver Phase Bias Calibration for Undifferenced Ambiguity Resolution", Proc. of the 2008 National Technigal Meeting of the Ion, San Diego, CA, USA, Jan. 28, 2008, pp. 711-719.

M. Gabor and S. Nerem: "Satellite—satellite single difference phase calibration as applied to ambiguity resolution", Navigation, Journal of the Institute of Navigation, vol. 49, No. 4, pp. 223-242, 2002.

P. Teunissen: "Success Probability of Integer GPS Ambiguity Rounding and Bootstrapping", Journal of Geodesy, vol. 72, pp. 606-612, Springer, 1998.

P. Teunissen: "The least-squares ambiguity decorrelation adjustment: a method for fast GPS ambiguity estimation", Journal of Geodesy, vol. 70, pp. 65-82, 1995.

\* cited by examiner

METHOD FOR DETERMINING BIASES OF SATELLITE SIGNALS

CROSS-REFERENCE TO RELATED APPLICATION

This present application claims priority of European patent application No. EP 09 178 573.3 filed on Dec. 9, 2009, the disclosure of which is hereby incorporated by reference in its entirety as part of the present disclosure.

FIELD OF THE INVENTION

The invention relates to a method for determining biases of satellite signals emitted by satellites of a satellite navigation system and received by reference stations comprising the acts:
receiving the satellite signals of the satellites by a plurality of reference stations, and
determining systematic instrumental errors based on the satellite signals received from the satellites by using a recursive state estimator.

BACKGROUND OF THE INVENTION

Such a method is known from E. SARDON, A. RIUS, N. ZARRAOA: "Estimation of the transmitter and receiver differential biases and the ionospheric total electron content from Global Positioning System observations" Radio Science, vol. 29, no. 3, 1994, pages 577-586. In the known method, the instrumental phase biases of satellites and receivers are lumped together with the phase ambiguities to form cycle slipping phase biases. After estimating the cycle slipping phase biases, linear combinations of the satellite and receiver instrumental group delay biases are determined together with the ionospheric delay using a Kalman filter. Lumping the phase biases with the phase ambiguities means that K+R biases are mapped on K·R ambiguities, resulting in a loss of information.

Within the known method, the cycle slipping phase biases are determined using a method described in GEOFFREY BLEWITT: "An Automatic Editing Algorithm For GPS Data" Geophysical Research Letters, vol. 17, no. 3, March 1990, pages 199-202. In this method the cycle slipping phase biases are determined using a widelane combination of P-code pseudorange measurements and by determining the widelane bias by a recursive state estimator. For identifying cycle slips, the determined wide lane biases are searched for discontinuities. The cycle slip itself can be calculated by evaluating cycle slips in an ionospheric combination of phase measurements. It is further proposed to resolve undetected cycle slips by using ambiguity resolution techniques.

Precise point positioning with integer ambiguity resolution requires precise estimates of satellite phase, satellite code, receiver phase and receiver code biases. It is known that satellite biases are changing slowly over time, e.g. Ge et al. [1], Gabor and Nerem [2] and Laurichesse and Mercier [3] have observed changes in narrowlane biases of at most 5 cm within a day and of less than 1 mm within 30 seconds.

The known method nevertheless fails to provide the required precision.

SUMMARY OF THE INVENTION

Proceeding from this related art, the invention seeks to provide a method with improved accuracy.

This object is achieved by a method having the features of the independent claim. Advantageous embodiments and refine-ments are specified in claims dependent thereon.

In the method, while determining the systematic instrumental errors, separate individual values for instrumental code biases and instrumental ambiguity-free phase biases of the satellites and reference stations as well as phase ambiguities of the satellite signals are determined by using the recursive state estimator, which determines the biases, the phase ambiguities and the positions of the satellites. By determining separate individual values for code biases and elementary phase biases these systematic instrumental errors can be determined with much higher accuracy than in conventional methods, in which a common bias is determined for satellites and reference stations or in which phase biases of the satellites and reference stations ambiguities are lumped with the biases, resulting in a loss of information, since the information that the ambiguities must be integer valued is not used. In contrast to these known methods, the method disclosed herein allows to use the information, that the ambiguities must be integer values, resulting in an improved accuracy in the determination of the phase biases.

In one embodiment, while determining the systematic instrumental errors, phase ambiguities of the satellite signals of the satellites are determined in addition to instrumental code biases and phase biases of the satellites and reference stations by using the recursive state estimator, which determines the biases, the phase ambiguities and the positions of the satellites. By determining the phase ambiguities in parallel to the code and phase biases, the ambiguities can become so accurate that it will finally be possible to fix the ambiguities. The fixing of the ambiguities reduces the number of unknown in subsequent filtering steps resulting in an improved accuracy of the biases, which are determined by the subsequent filtering steps.

Generally, the code biases and phase biases of the satellites and reference stations are determined on at least two frequencies.

For reducing the number of unknowns, which must be determined in the recursive state estimator, selected biases are mapped into the ranges and into the ionospheric delays, selected biases of one satellite are mapped to the biases of the reference stations, and a subset of integer ambiguities are mapped to the phase biases.

In one embodiment, a multi-stage recursive state estimator is used, the first stage recursive state estimator estimating ranges, range rates, ionospheric delays, unmapped biases of the reference stations and satellites, as well as ambiguities, the last stage estimating the positions of the satellites, satellite velocities, tropospheric zenith delays, as well as the unmapped biases of the reference stations and satellites, and wherein a selection of the floating ambiguities is fixed before the last stage recursive state estimator. Since the ambiguities are fixed before the last stage recursive state estimator is applied, the last stage recursive state estimator can be used for determining further unknowns beyond the unknowns determined by the first stage recursive state estimator.

In most cases, the recursive state estimator will be a dual-stage recursive state estimator.

In the first stage recursive state estimator, on two frequencies, the code biases can be mapped into the ranges and into the ionospheric delays, the phase biases of one satellite can be mapped to the phase biases of the reference stations and a subset of integer ambiguities can be mapped to the phase biases resulting in set of linear independent unknowns.

If more than two frequencies are used, the code biases are not mappable and are estimated together with the phase biases on all frequencies, on which the recursive state estimator is applied.

The last stage recursive state estimator can be used for estimating a combination of code biases, which have been absorbed in the ranges.

In the first stage recursive state estimator, on two frequencies, the phase biases can also be mapped into the ranges and into the ionospheric delays, the code biases of one satellite can be mapped to code biases of the reference stations and a subset of integer ambiguities can be mapped to the code biases.

If more than two frequencies are used, the phase biases are not mappable and are estimated together with the code biases on all frequencies, on which the recursive state estimator is applied.

The last stag recursive state estimator can be used for estimating a combination of phase biases, which have been absorbed in the ranges.

For further reducing the number of unknowns, for each reference station one integer ambiguity, and additionally for each satellite one integer ambiguity is combined with phase biases of the reference stations or satellites, wherein the combination is performed for the frequencies, on which the recursive state estimator is applied.

The phase ambiguities can be fixed more accurately if the integer ambiguities are sequentially fixed by a partial integer decorrelation, wherein the degree of decorrelation is adapted to the number of ambiguities.

The order of the fixing sequence is determined using a cost function which evaluates the rounding error of a floating ambiguity and the reliability of the estimate of the floating ambiguity, so that in each fixing step the least uncertain ambiguity is fixed.

The recursive state estimator can finally also be used for estimating a grid of ionospheric vertical delays and a combination of code biases, which have been absorbed in the ionospheric delay.

The recursive state estimator is generally a least-square recursive state estimator, in particular a Kalman filter.

BRIEF DESCRIPTION OF THE DRAWINGS

Further advantages and properties of the present invention are disclosed in the following description, in which exemplary embodiments of the present invention are explained in detail based on the drawings:

FIG. 13 contains residuals of slant ionospheric delay; and

DETAILED DESCRIPTION OF THE INVENTION

Figure 1:
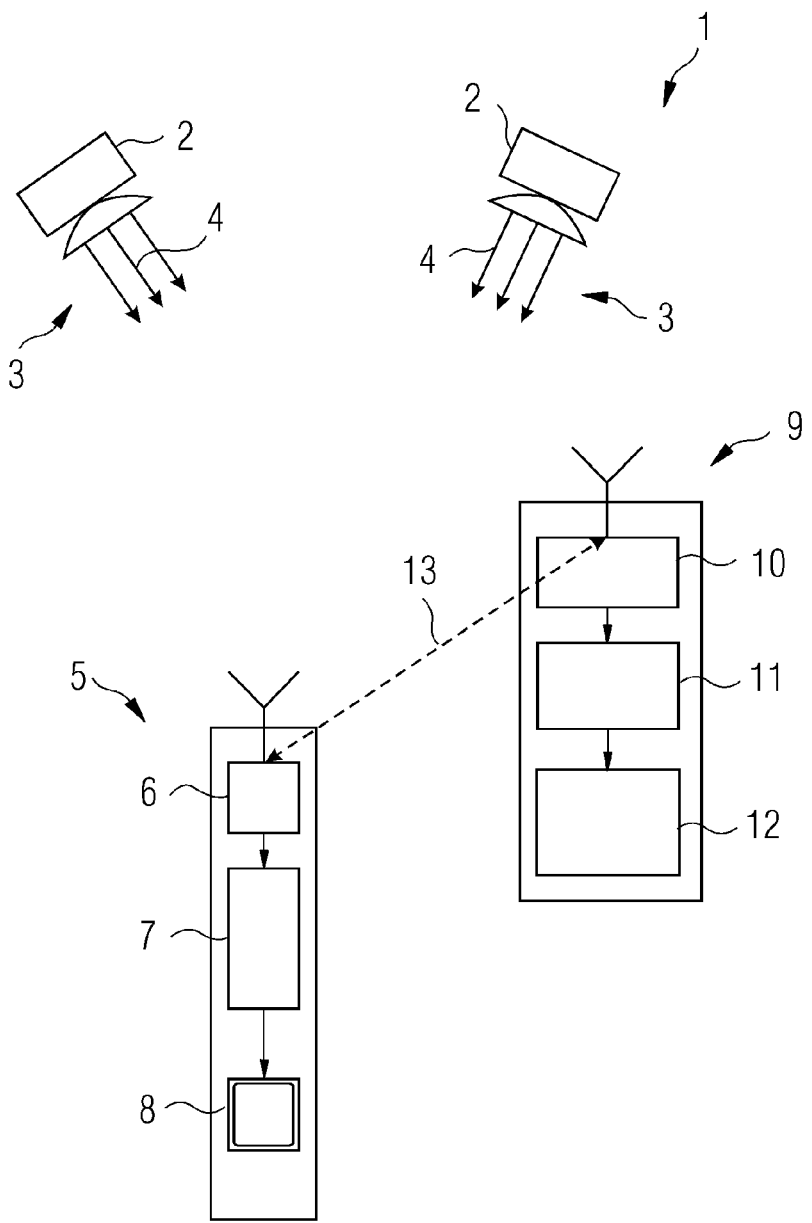
FIG. 1 depicts a global navigation satellite system comprising reference stations.

FIG. 1 shows a global navigation satellite system 1 which comprises satellites 2 orbiting around the earth and emitting navigation signals 3 modulated on a number of carrier signals 4.

A user system or navigation device 5 comprises a receiver 6 which is connected to a signal processor 7. The signal processor 7 processes the navigation signal 3 received from the satellites 2 and displays the results on a display 8 of the navigation device 5.

A stationary reference station 9 equally comprises a receiver 10 connected to a signal processor 11 and a transmission unit 12, which transmitts system informations to the navigations devices 5. In particular the satellite biases and information on the ionospheric delay are transmitted to the navigations devices 5.

For determining the position of the navigation device 5 various methods can be used. Generally code measurements of code signals transmitted by the carrier signals and phase measurement of the actual phase of the carrier signals are needed for determining the position of the navigations device 5 with high accuracy. In addition the phase ambiguity of the phase measurements must be resolved. Integer ambiguity resolution for absolute positioning requires precise estimates of satellite phase, satellite code, receiver phase and receiver code biases. The biases are generally determined by the reference stations 10 transmitted form the reference stations 10 to the navigation devices 5. Based on the transmitted biases, the navigation devices 5 is able to determine its position. For determining the position of the navigation device 5 various methods can be used. In the double difference method the length d of a baseline vector 13 between the navigation device 5 and a reference station 10 is determined.

It should be noted that the phase ambiguities refer to elementary phase ambiguities that are shorter than one wavelength of the carrier signals 4.

Figure 2:
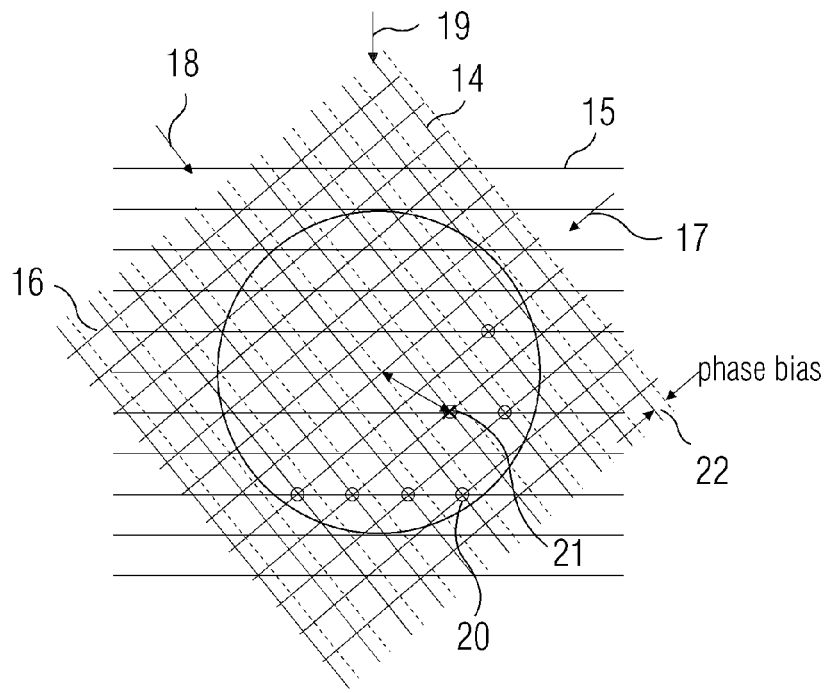
FIG. 2 illustrates the impact of phase biases on determining positions.

FIG. 2 illustrates the impact of the phase biases on determining the position of the navigation device 5. FIG. 2 shows wave fronts 14, 15 and 16 of carrier signals 4 emitted by three different satellites 2. The directions of incidence are indicated by arrows 17, 18 and 19. The wave fronts intersect at intersection points 20 which form candidates for an actual position 21 of the naviagation device 5. A circle 22 indicates the region in which the actual position ought to be located according to other measurements, for instance code measurements. Among the intersection points 20, the one intersection point 20 having the highest probability to correspond to the actual position 21 is chosen as actual position. As can be recognized from FIG. 2, a phase bias 22, that causes the wave front 14 to be shifted may result in a position bias 23, since the intersection points 20 are shifted as well, so that another one of the intersection points 20 will be considered as actual position 21.

Ge et al. [1], Gabor and Nerem [2] and Laurichesse and Mercier [3] have tried to estimate the L1 phase and code biases. The derivation is briefly introduced here and starts with the geometry-free, ionosphere-free Melbourne-Wübbena combination [4]. It combines the phase measurements $\phi_1, \phi_2$ (in units of cycles) and the code measurements $\rho_1$ and $\rho_2$ on the frequencies $f_1$ and $f_2$ as $$\left(\frac{f_1}{f_1-f_2}\lambda_1\phi_1 - \frac{f_2}{f_1-f_2}\lambda_2\phi_2\right) - \left(\frac{f_1}{f_1+f_2}\rho_1 + \frac{f_2}{f_1+f_2}\rho_2\right) = \lambda_w b_w + \varepsilon_w, \quad (1)$$

with the widelane wavelength $$\lambda_w = \frac{1}{\frac{1}{\lambda_1} - \frac{1}{\lambda_2}}, \quad (2)$$

the combined ambiguity/bias term $$b_w = N_1 - N_2 + b_{\phi_1} - b_{\phi_2} - \frac{f_1-f_2}{f_1+f_2}\cdot\frac{b_{\rho_1}}{\lambda_1} - \frac{f_1-f_2}{f_1+f_2}\cdot\frac{b_{\rho_2}}{\lambda_2}, \quad (3)$$

where $N_1$ and $N_2$ are integer ambiguities, and $\varepsilon_w$ represents the combined phase and code noise.

In a second step, the geometry-preserving, ionosphere-free phase only combination is computed, i.e.

$$\frac{f_1^2}{f_1^2-f_2^2}\lambda_1\phi_1 - \frac{f_2^2}{f_1^2-f_2^2}\lambda_2\phi_2 = g + b_c + \varepsilon_c \quad (4)$$

with the geometry g including the range and some non-dispersive errors that are introduced in the next section, and the combined ambiguity/bias term $$b_c = \frac{f_1^2}{f_1^2-f_2^2}\cdot\lambda_1(N_1+b_{\phi_1}) - \frac{f_2^2}{f_1^2-f_2^2}\cdot\lambda_2(N_2+b_{\phi_2}). \quad (5)$$

The biases of the Melbourne-Wübbena combination and of the ionosphere-free combination are combined into $$\frac{f_1+f_2}{c}\cdot b_c - \frac{f_2}{f_1-f_2}\cdot b_w = N_1 + \tilde{b}_{\phi_1} \quad (6)$$

with $$\tilde{b}_{\phi_1} = b_{\phi_1} + \frac{f_2}{f_1+f_2}\cdot\frac{b_{\rho_1}}{\lambda_1} + \frac{f_2}{f_1+f_2}\cdot\frac{b_{\rho_2}}{\lambda_2}. \quad (7)$$

Similarly, an estimate of the phase bias on the second frequency can be obtained as $$\tilde{b}_{\phi_2} = b_{\phi_2} + \frac{f_1}{f_1+f_2}\cdot\frac{b_{\rho_1}}{\lambda_1} + \frac{f_1}{f_1+f_2}\cdot\frac{b_{\rho_2}}{\lambda_2}. \quad (8)$$

The transmission of $\tilde{b}_{\phi_1}$ and $\tilde{b}_{\phi_2}$ enables an unbiased estimation of L1 and L2 integer ambiguities at the mobile receiver. However, these phase biases also include a weighted combination of code biases on both frequencies. It can be shown that these L1/L2 pseudo-phase biases correspond to a geometry-preserving, ionosphere-free narrowlane combination with a wavelength of only 10.7 cm. There does not exist any geometry-preserving, ionosphere-free combination with the applicability of these biases and a larger wavelength than 10.7 cm. Moreover, a substantial code noise can be observed in the narrowlane combinations.

In the present application, a new method for bias estimation on multiple frequencies with a Kalman filter is proposed. It consists of four acts that are performed after a measurement 24 of the code and phase signals: In a first step, an initial least-squares estimation 25 of ranges, ionospheric delays, ambiguities, receiver phase biases and satellite phase biases is performed. In a second step, a mapping 26 is performed, in which selected code or phase biases are mapped into other unknowns such as a selection of ambiguities, the ranges or the ionospheric delays. This step implies a selection of the variables to be determined in the next step. The ambiguity mapping 26 must not necessarily be performed before the next step but may be implicitly contained in the next step by the selection of unknowns determined in the next step. The next step is a first interative state estimation 27, in which the accuray of the estimated ranges, ionospheric delays, ambiguities, receiver phase biases and satellite phase biases is efficiently improved. For the first state estimation 27, a Kalman filter can be used, in which the code biases are absorbed in the ranges and ionospheric delays, and a subset of ambiguities is mapped to the phase biases to remove linear dependencies between the unknown parameters. The number of unknowns is reduced by fixing 28 a subset of ambiguities, once the float ambiguities have sufficiently converged.

The real-valued a posteriori ambiguity estimates are decorrelated by an integer ambiguity transformation to reduce the time of ambiguity resolution. Finally, a second iterative state estimation 29, in particular a second Kalman filter is used to separate the receiver and satellite code biases and the tropospheric delays from the ranges.

Measurement Model and Bias Estimation Method

As mentioned above, ambiguity resolution for precise point positioning requires the estimation of phase and code biases by a network of reference stations. The following model is used for dual frequency undifferenced phase and code measurements of satellite k, receiver r and epoch $t_n$:

$$\phi_{1,r}^k(t_n) = g_r^k(t_n) - I_{1,r}^k(t_n) + \lambda_1 N_{1,r}^k + \beta_{1,r} + \beta_1^k + \epsilon_{1,r}^k(t_n)$$

$$\phi_{2,r}^k(t_n) = g_r^k(t_n) - q_{12}^2 I_{1,r}^k(t_n) + \lambda_2 N_{2,r}^k + \beta_{2,r} + \beta_2^k + \epsilon_{2,r}^k(t_n)$$

$$\rho_{1,r}^k(t_n) = g_r^k(t_n) + I_{1,r}^k(t_n) + b_{1,r} + b_1^k + \eta_{1,r}^k(t_n)$$

$$\rho_{2,r}^k(t_n) = g_r^k(t_n) + q_{12}^2 I_{1,r}^k(t_n) + b_{2,r} + b_2^k + \eta_{2,r}^k(t_n), \quad (9)$$

where $g_r$ denotes the range including the clock offset and tropospheric delay, $I_{1,r}^k$ is the ionospheric delay, $q_{1m} = f_1/f_m$ is the ratio of frequencies, $N_{m,r}^k$ is the integer ambiguity, $\beta_{m,r}$ is the receiver phase bias, $\beta_m^k$ is the satellite phase bias, $b_{m,r}$ is the receiver code bias and $b_m^k$ is the satellite code bias on frequency m={1,2}.

A least-squares estimation of $g_r^k(t_n)$, $I_{1,r}^k(t_n)$, $N_{1,r}^k$, $N_{2,r}^k$, $\beta_{m,r}$, $\beta_m^k$, $b_{m,r}$ and $b_m^k$ is infeasible and not necessary even for an arbitrary large number of epochs T, reference stations R and satellites K as the extended geometry matrix becomes rank deficient. This rank deficiency can be removed from Equation (9) by a set of transformations.

First, the code biases of the first and second frequency are mapped to the ranges/clock offsets and ionospheric delays, i.e.

$$\tilde{g}_r^k = g_r^k + b_{g,r} + b_g^k$$
$$\tilde{I}_r^k = I_r^k + b_{I,r} + b_I^k \quad \text{, with} \quad (10)$$

$$b_{g,r} = \frac{b_{2,r} - q_{12}^2 b_{1,r}}{1 - q_{12}^2}, \; b_g^k = \frac{b_2^k - q_{12}^2 b_1^k}{1 - q_{12}^2}$$

$$b_{I,r} = \frac{b_{1,r} - q_{11}^2 b_{2,r}}{1 - q_{12}^2}, \; b_I^k = \frac{b_1^k - q_{11}^2 b_2^k}{1 - q_{12}^2}, \quad (11)$$

which is obtained by solving the following system of equations for $\tilde{g}_r^k$ and $\tilde{I}_r^k$:

$$\tilde{g}_r^k + q_{11}^2 \tilde{I}_r^k = g_r^k + q_{11}^2 I_r^k + b_{1,r} + b_1^k$$

$$\tilde{g}_r^k + q_{12}^2 \tilde{I}_r^k = g_r^k + q_{12}^2 I_r^k + b_{2,r} + b_2^k, \quad (12)$$

The phase biases of the receiver and satellite have to be corrected for the absorbed code biases, i.e.

$$\tilde{\beta}_{1,r} = \beta_{1,r} - b_{g,r} + q_{11}^2 b_{I,r}$$

$$\tilde{\beta}_{2,r} = \beta_{2,r} - b_{g,r} + q_{12}^2 b_{I,r}$$

$$\tilde{\beta}_1^k = \beta_1^k - b_g^k + q_{11}^2 b_I^k$$

$$\tilde{\beta}_2^k = \beta_2^k - b_g^k + q_{12}^2 b_I^k. \quad (13)$$

A second transformation eliminates the satellite phase biases $\beta_1^1$ and $\beta_2^1$ by combining them with the receiver phase biases, i.e.

$$\tilde{\tilde{\beta}}_{1,r} = \tilde{\beta}_{1,r} + \tilde{\beta}_1^1$$

$$\tilde{\tilde{\beta}}_{2,r} = \tilde{\beta}_{2,r} + \tilde{\beta}_2^1$$

$$\tilde{\tilde{\beta}}_1^k = \tilde{\beta}_1^k - \tilde{\beta}_1^1$$

$$\tilde{\tilde{\beta}}_2^k = \tilde{\beta}_2^k - \tilde{\beta}_2^1. \quad (14)$$

Thus, the phase and code measurements of Equation (9) can be rewritten as $$\varphi_{1,r}^k(t_n) = \tilde{g}_r^k(t_n) - \tilde{I}_{1,r}^k(t_n) + \lambda_1 N_{1,r}^k + \tilde{\tilde{\beta}}_{1,r} + \tilde{\tilde{\beta}}_1^k + \epsilon_{1,r}^k(t_n)$$

$$\varphi_{2,r}^k(t_n) = \tilde{g}_r^k(t_n) - q_{12}^2 \tilde{I}_{1,r}^k(t_n) + \lambda_2 N_{2,r}^k + \tilde{\tilde{\beta}}_{2,r} + \tilde{\tilde{\beta}}_2^k + \epsilon_{2,r}^k(t_n)$$

$$\rho_{1,r}^k(t_n) = \tilde{g}_r^k(t_n) + \tilde{I}_{1,r}^k(t_n) + \eta_{1,r}^k(t_n)$$

$$\rho_{2,r}^k(t_n) = \tilde{g}_r^k(t_n) + q_{12}^2 \tilde{I}_{1,r}^k(t_n) + \eta_{2,r}^k(t_n). \quad (15)$$

The system of Equations (15) is still rank deficient as biases and ambiguities can not be completely separated. There exist three approaches to overcome the remaining rank deficiency of degree 2R+2(K−1) (with K=27 being the number of satellites): The first one is to map all biases to ambiguities which results in a poor performance as the integer property of the ambiguities is lost. The second approach is an inverse mapping, i.e. 2R+2(K−1) ambiguities are mapped to biases and the remaining ambiguities are kept. The third approach uses a search to separate the ambiguities from the biases. In this application, the second approach is analyzed.

Clearly, the number of visible satellites and, thus, the number of unknown integer ambiguities depends on the location of the reference station and the measurement epoch. FIG. 2 shows a map of the global network of 37 Galileo Sensor Stations with the two control centers at Oberpfaffenhofen and Fucino. The Galileo Sensor Stations, which assume the function of the reference stations 9 are depicted as black dots. The positions of the 27 Galileo satellites are projected to the earth and indicated as black stars.

Figure 3:
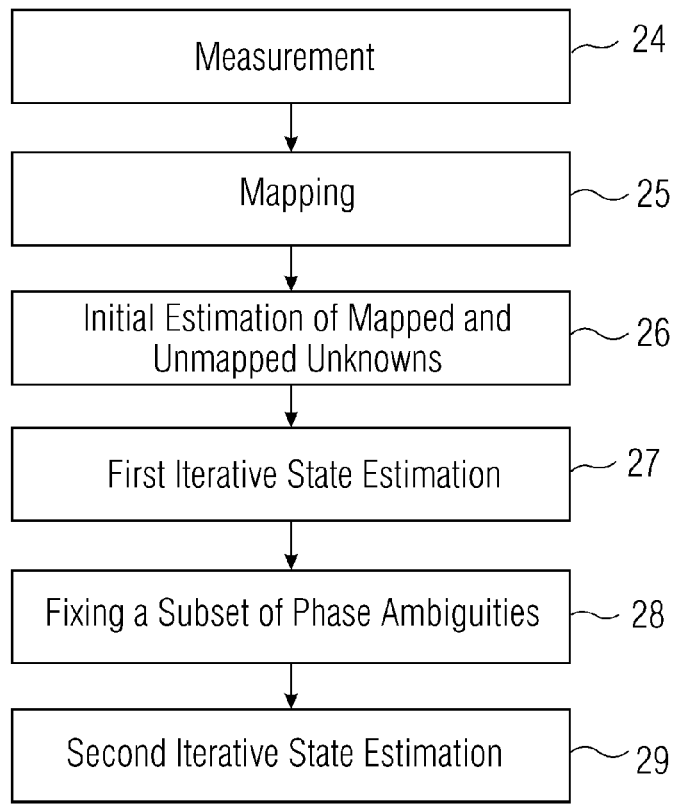
FIG. 3 contains a flow diagram of the method for determining systematic instrumental errors.

FIG. 3 shows the set of $l = \Sigma_{r=1}^R K_r$ integer ambiguities (with $K_r$ being the number of visible satellites from ground station r) for this network of 39 reference stations and 27 Galileo satellites: Each column represents the visible satellites for a particular reference station. The black dots refer to ambiguities that have to be estimated while the white ones are absorbed in the biases. The white dots include the ambiguities with the largest satellite index for each reference station as well as the largest reference station index for each satellite, and have been determined by Gaussian elimination. As five ambiguities per frequency fulfill both criteria simultaneously, four additional ambiguities have to be removed for a full rank measurement sensitivity matrix. The remaining subset of ambiguities has to be estimated for precise bias estimation.

The mapping is further illustrated by means of the following example of the mapping of phase biases and ambiguities for three receivers and three satellites.

In this case the receiver phase biases are:

$$\tilde{\tilde{\beta}}_{m,1} = \tilde{\beta}_{m,1} + \tilde{\beta}_m^3 + \lambda_m N_{m,1}^3$$

$$\tilde{\tilde{\beta}}_{m,2} = \tilde{\beta}_{m,2} + \tilde{\beta}_m^3 + \lambda_m N_{m,2}^3$$

$$\tilde{\tilde{\beta}}_{m,3} = \tilde{\beta}_{m,3} + \tilde{\beta}_m^3 + \lambda_m N_{m,3}^3 \quad (16)$$

with the satellite phase biases:

$$\tilde{\tilde{\beta}}_m^1 = \tilde{\beta}_m^1 - \tilde{\beta}_m^3 + \lambda_m (N_{m,3}^1 - N_{m,3}^3)$$

$$\tilde{\tilde{\beta}}_m^2 = \tilde{\beta}_m^2 - \tilde{\beta}_m^3 + \lambda_m (N_{m,3}^2 - N_{m,3}^3)$$

$$\tilde{\tilde{\beta}}_m^3 = 0 \quad (17)$$

and with the Integer ambiguities:

$$N_{m,1}^1 = N_{m,1}^1 - N_{m,1}^3 - N_{m,3}^1 + N_{m,3}^3$$

$$N_{m,1}^2 = N_{m,1}^2 - N_{m,1}^3 - N_{m,3}^2 + N_{m,3}^3$$

$$N_{m,1}^3 = 0$$

$$N_{m,1}^1 = N_{m,2}^1 - N_{m,2}^3 - N_{m,3}^1 + N_{m,3}^3$$

$$N_{m,2}^2 = N_{m,2}^2 - N_{m,2}^3 - N_{m,3}^2 + N_{m,3}^3$$

$$N_{m,2}^3 = 0$$

$$N_{m,3}^1 = 0$$

$$N_{m,3}^2 = 0$$

$$N_{m,3}^3 = 0 \quad (18)$$

If a fourth satellite rises, the previous mapping can be kept and only the ambiguities and satellite phase biases for the additional satellite have to be estimated, i.e.

$$\tilde{\tilde{\beta}}_m^4 = \tilde{\beta}_m^4 - \tilde{\beta}_m^3 + N_{m,1}^4 - N_{m,1}^3$$

$$N_{m,1}^4 = 0$$

$$N_{m,2}^4 = N_{m,2}^4 - N_{m,2}^3 - N_{m,1}^4 + N_{m,1}^3$$

$$N_{m,3}^4 = N_{m,3}^4 - N_{m,3}^3 - N_{m,1}^4 + N_{m,1}^3. \quad (19)$$

It should be noted that the mapping can also be performed by exchanging the role of the phase and code biases. For instance, instead of mapping the code biases of the first and second frequency to the ranges/clock offsets and ionospheric delays, the phase biases of the first and second frequency can also be mapped to the ranges/clock offsets and ionospheric delays and so on. In the following, the desciption is continued with the mapping as described above:

The proposed bias estimation now consists of four steps as illustrated in FIG. 3:

In the first step, the least-squares estimation 26 of the transformed ranges $\tilde{g}_r^k(t_n)$, ionospheric delays $\tilde{I}_{1,r}^k(t_n)$, receiver phase biases $\tilde{\beta}_{1,r}$ and $\tilde{\beta}_{2,r}$, and the subset of ambiguities is performed. As the number of unknowns 2lT+2l increases dramatically with T, the least-squares estimation is limited to a few epochs. The choice of a subset of ambiguities implies a certain parameter mapping.

In the second step corresponding to the first iterative state estimation 27, a Kalman filter is used to efficiently improve the accuracy of the bias estimates. The phase and code measurements are combined in a vector $z_n$, i.e.

$$z_n = [\varphi_{1,1}^1(t_n), \ldots, \varphi_{1,R}^{K_R}(t_n), \varphi_{2,1}^1(t_n), \ldots, \varphi_{2,R}^{K_R}(t_n), \quad (20)$$
$$\rho_{1,1}^1(t_n), \ldots, \rho_{1,R}^{K_R}(t_n), \rho_{2,1}^1(t_n), \ldots, \rho_{2,R}^{K_R}(t_n)]^T$$
$$= H_n^{(1)} x_n + v_n,$$

where $H_n^{(1)}$ denotes the geometry-free coefficient matrix and $x_n$ is the state vector that shall be defined as $$x_n = [g^T(t_n), \dot{g}^T(t_n), I^T(t_n), \beta_R^T, \beta_S^T, N^T]^T, \quad (21)$$

with $$g(t_n) = [\tilde{g}_1^1(t_n), \ldots, \tilde{g}_1^{K_1}(t_n), \ldots, \tilde{g}_R^{K_R}(t_n)]^T$$
$$\dot{g}(t_n) = [\dot{\tilde{g}}_1^1(t_n), \ldots, \dot{\tilde{g}}_1^{K_1}(t_n), \ldots, \dot{\tilde{g}}_R^{K_R}(t_n)]^T$$
$$I(t_n) = [\tilde{I}_1^1(t_n), \ldots, \tilde{I}_1^{K_1}(t_n), \ldots, \tilde{I}_R^{K_R}(t_n)]^T$$
$$\beta_R = [\tilde{\beta}_{1,1}, \ldots, \tilde{\beta}_{1,R}, \ldots, \tilde{\beta}_{2,1}, \ldots, \tilde{\beta}_{2,R}]^T$$
$$\beta_S = [\tilde{\beta}_1^2, \ldots, \tilde{\beta}_1^K, \ldots, \tilde{\beta}_2^2, \ldots, \tilde{\beta}_2^K]^T, \quad (22)$$

and the vector N of 2l−2R−2(K−1) integer ambiguities. In this work, the code noise $v_n \sim \mathcal{N}(0, \Sigma_v)$ is assumed to be uncorrelated between satellites. The standard deviations have been set to the Cramer Rao bounds that are shown in Table 1 for the wideband Galileo signals at a carrier to noise power ratio of 45 dB-Hz. The phase noise standard deviations have been assumed to be 1 mm.

The state space model for $x_n$ is given by $$x_n = \Phi x_{n-1} + w_n, \quad (23)$$

with the state transition matrix $$\Phi = \begin{bmatrix} 1^{l \times l} & \delta t 1^{l \times l} & 0 \\ 0 & 1^{l \times l} & 0 \\ 0 & 0 & 1^{3l \times 3l} \end{bmatrix}, \quad (24)$$

where $\delta t$ represents the interval between two measurements. The process noise $w_n \sim \mathcal{N}(0, \Sigma_w)$ is assumed to follow a Gaussian distribution with a standard deviation of 1 m for acceleration noise and 1 cm for the ionospheric delay.

The state covariance matrix of range and range-rate related errors has been derived by Brown et al. in [6] and is given by $$\Sigma_{w,g\dot{g}} = \begin{bmatrix} S_p \cdot \Delta t^3 / 3 & S_p \cdot \Delta t^2 / 2 \\ S_p \cdot \Delta t^2 / 2 & S_p \cdot \Delta t \end{bmatrix} \otimes 1^{l \times l}, \quad (25)$$

which is used to model the covariance matrix of the whole state vector as $$\Sigma_w = \begin{bmatrix} \Sigma_{w,g\dot{g}} & & \\ & \Sigma_{w,I} & \\ & & \Sigma_{w,b} \end{bmatrix}, \text{ with} \quad (26)$$

$$\Sigma_{w,I} = \sigma_I^2 \cdot 1^{l \times l} \quad (27)$$
$$\Sigma_{w,b} = 0^{2l \times 2l},$$

i.e. no process noise is assumed for the biases and integer ambiguities. In this work, the spectral amplitudes of the random walk processes have been set to $S_p = 1$ m and $\sigma_I = 1$ cm.

The a posteriori state estimate $\hat{x}_n^+$ is given by $$\hat{x}_n^+ = \hat{x}_n^- + K_n^{(1)}(z_n - H_n^{(1)} \hat{x}_n^-), \quad (28)$$

with the Kalman gain $K_n^{(1)}$, the measurement sensitivity matrix $H_n^{(1)}$ which depends only on the wavelengths $\lambda_1$ and $\lambda_2$, and the a priori state estimate $\hat{x}_n^-$. The latter one is obtained by the prediction $$\hat{x}_n^- = \Phi \hat{x}_{n-1}^+. \quad (29)$$

Figure 4:
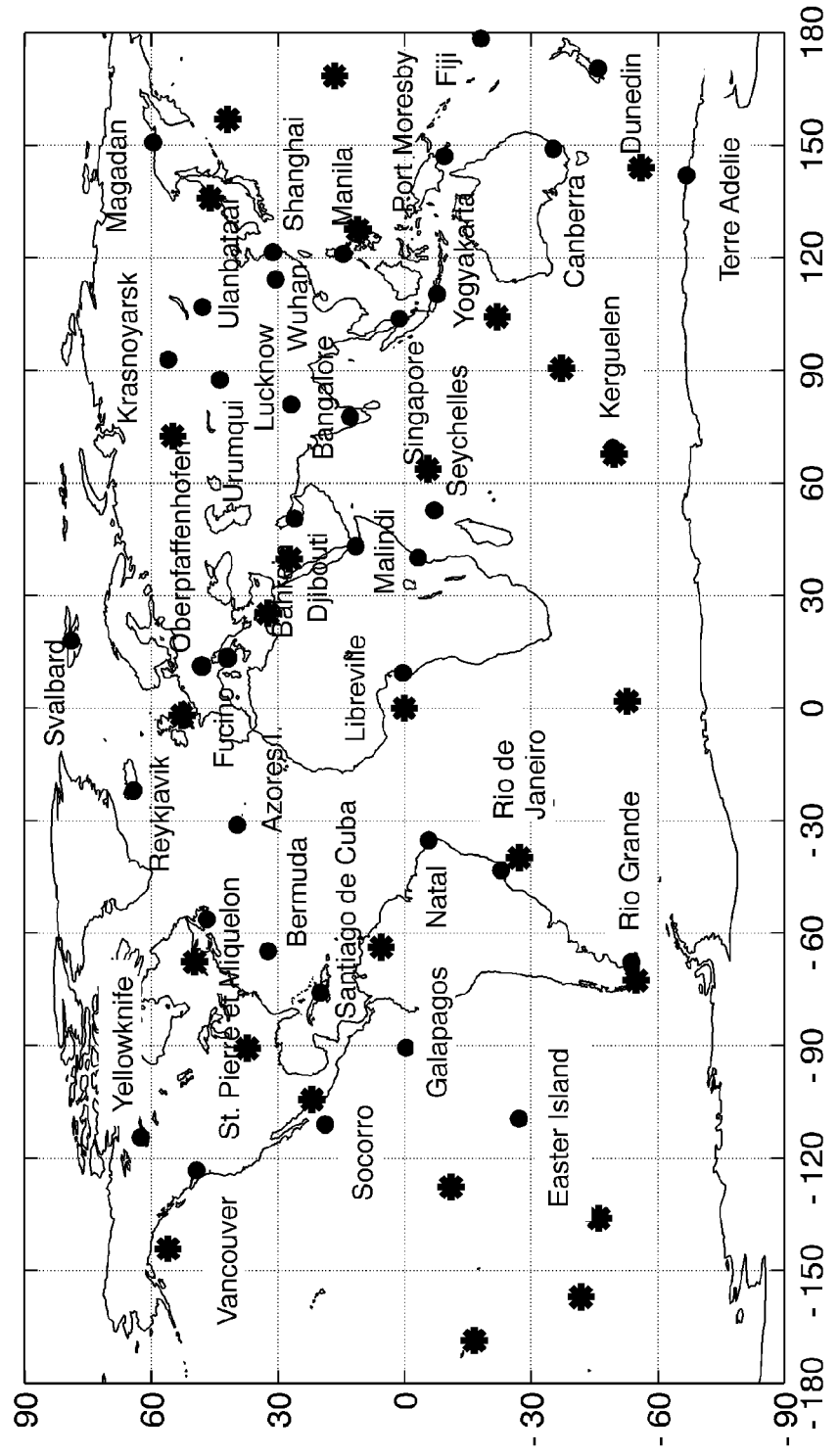
FIG. 4 shows the global network of 37 Galileo Sensor Stations, the two Control Centers at Oberpfaffenhofen and Fucino, and the projection of 27 Galileo satellites.

The third step comprises the fxing 28 of a subset of ambiguities: The integer decorrelation transformation Z of Teunissen [7] is applied to the float ambiguity estimates, i.e.

$$\hat{N}'^+ = Z \hat{N}^+, \quad (30)$$

which improves the reliability of sequential ambiguity resolution ('bootstrapping'). As there exist 364 ambiguities in FIG. 4, the computation of $Z \in \mathbb{Z}^{364 \times 364}$ includes a large computational burden. A partial integer decorrelation as introduced in [5] enables a substantial reduction in the computational effort at the price of a slight degradation in the bias accuracy. It consists of L decorrelation steps, i.e.

$$Z = Z^{(1)} \cdot Z^{(2)} \cdot \ldots \cdot Z^{(L)}, \quad (31)$$

where each $Z^{(n)}$ includes an integer decorrelation $Z_1^{(n)}$ and a permutation $Z_2^{(n)}$ of two ambiguities, i.e.

$$Z^{(n)} = Z_1^{(n)} \cdot Z_2^{(n)}. \quad (32)$$

The partial integer decorrelation is used here to reduce the computational burden while it was originally developed in [5] to find the optimal trade-off between variance reduction and bias amplification.

The k-th conditional ambiguity estimate is given by $$\hat{N}'^+_{k|1,\ldots,k-1} = \quad (33)$$
$$\hat{N}'^+_k - \sum_{j=1}^{k-1} \sigma_{\hat{N}'^+_k \hat{N}'^+_{j|1,\ldots,j-1}} \sigma^{-2}_{\hat{N}'^+_{j|1,\ldots,j-1}} \cdot (\hat{N}'^+_{j|1,\ldots,j-1} - [\hat{N}'^+_{j|1,\ldots,j-1}]),$$

where $\sigma_{\hat{N}'^+_k \hat{N}'^+_{j|1,\ldots,j-1}}$ is the covariance between the k-th float and j-th conditional ambiguity estimates, $\sigma^2_{\hat{N}'^+_{j|1,\ldots,j-1}}$ denotes the variance of the j-th conditional ambiguity estimate, and [·] is the rounding operator. The ambiguity fixing is then done by rounding the conditional float estimate, i.e.

$$\check{N}'^+_k = [\hat{N}'^+_{k|1,\ldots,k-1}] \quad (34)$$

which immediately improves the accuracy of the bias estimates. The probability of wrong fixing depends substantially on the order of ambiguity fixings. Here, both the fixing decision and fixing order shall be determined from the cost function $$\min_{\hat{N}_k^+}\left\{w_1 \cdot |\hat{N}_k'^+ - [\hat{N}_k'^+]| + w_2 \cdot \sigma_{\hat{N}_k'^+}\right\}, \quad (35)$$

where the first term represents the difference between the float ambiguity estimate and its nearest integer, and the second term describes the standard deviation of the a posteriori float ambiguity estimate. The first term takes modeling errors (e.g. multipath) into account, the second one describes the convergence of the Kalman filter statistics, and the parameters $w_1$ and $w_2$ were introduced to enable a certain weighting. Here, $w_1=2$ and $w_2=1$ have been chosen. The reliability of ambiguity fixing can be further increased by introducing the integrity constraints $$|\hat{N}_k'^+ - [\hat{N}_k'^+]| \overset{!}{\leq} 0.1 \text{ cycles and } \sigma_{\hat{N}_k'^+} \overset{!}{\leq} 0.1 \text{ cycles.} \quad (36)$$

In a fourth step corresponding to the second iterative state estimation 29, a second Kalman filter is used to estimate the receiver and satellite clock offsets, which also absorb the biases $\tilde{b}_{g_r}$ and $\tilde{b}_{g^k}$. The range estimates $\hat{\tilde{g}}_r^k$ of the first Kalman filter are now considered as measurements which can be decomposed into $$\tilde{g}_r^k(t_n) = (e_r^k)^T \cdot (x_r - x^k) + c \cdot (\delta\tilde{\tau}_r(t_n) - \delta\tilde{\tau}^k(t_n)) + T_r^k(t_n) + h_r^k(t_n) + o_r^k(t_n) \quad (37)$$

with the following notations:
$e_r^k$ unit vector from the satellite to the receiver
$x_r$ position of the reference station
$x^k$ position of the satellite
$T_r^k(t_n)$ tropospheric slant delay
$h_r^k(t_n)$ earth tides
$o_r^k(t_n)$ ocean tides
$c\delta\tilde{\tau}_r(t_n) = c\delta\tau_r(t_n) + b_{g_r}$ combination of receiver clock offset and geometry part of receiver code biases,
$c\delta\tilde{\tau}^k(t_n) = c\delta\tau^k(t_n) + b_{g^k}$ combination of satellite clock offset and geometry part of the satellite code biases A Kalman filter shall be used to estimate $c\delta\tilde{\tau}_r(t_n)$ and $c\delta\tilde{\tau}^k(t_n)$, or, alternatively, to estimte the difference between $c\delta\tilde{\tau}^k(t_n)$ and the precise satellite clocks provided by the International Geodetic Service (IGS). The final clocks currently (2010) have an RMS error of 75 ps and a standard deviation of only 20 ps.

The positions of the reference stations shall be assumed known. The satellite positions can be obtained from the IGS with an RMS error of 2.5 cm for the final orbits. The error in the satellite positions and velocities can be eventually included as additional states in the Kalman filter.

The tropospheric delay is factorized into a mapping function that can be well modeled and a zenith delay that is estimated as an additional state parameter. The earth and ocean tides can be corrected from a model and, thus, are not included as additional state parameters.

The obtained satellite bias estimates from both Kalman filters could be transmitted by an augmentation system (e.g. Ground or Satellite Based Augmentation System) to enable integer ambiguity resolution for precise point positioning and to improve the positioning accuracy. Moreover, the obtained satellite position estimates could be compared to the ones from the navigation message to detect and exclude erroneous satellites.

A. Simulation Results

Figure 5:
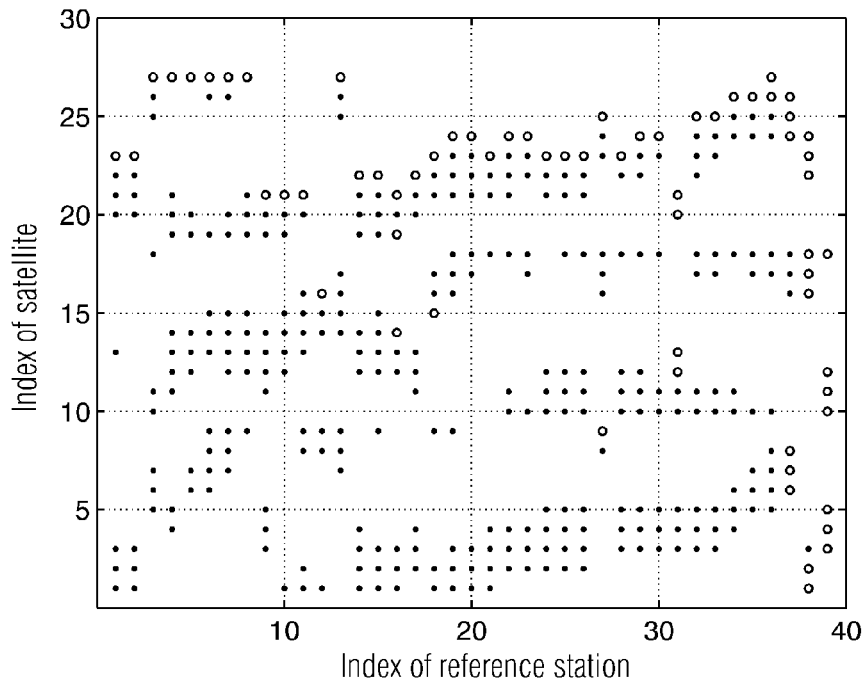
FIG. 5 depicts integer ambiguities for the network of 37 Galileo Sensor Stations and the two control centers for a snapshot of 27 Galileo satellites, wherein each column shows the visible satellites for a particular reference station and wherein the black dots refer to ambiguities that have to be estimated while the ambiguities associated with the white dotes are absorbed in the biases.

FIG. 5 shows the temporal evolution of the probability of wrong fixing and the standard deviations of the receiver and satellite bias estimates for $K_r=10$, $r \in \{1, \ldots, 20\}$ obtained by simulations.

The process noise was characterized by $S_p=1$ cm and $\sigma_I=1$ cm, i.e. there was no process noise for biases. Dual frequency code and phase measurements on E1 and E5 have been assumed.

The bias estimation was performed in two steps: An intial least-squares estimation and a Kalman filter to improve the accuracy efficiently.

The initial state vector was determined by a least-squares estimation from two epochs. The float ambiguity estimates of the Kalman filter converged sufficiently within 200 epochs and the ambiguities can be fixed sequentially with an error rate of less than $10^{-9}$ after integer decorrelation. The fixing was performed sequentially with integer decorrelation and reduced the bias uncertainty by a factor between 2 and 4 depending on the satellite, receiver and frequency. The fixing thus results in an immediate improvement of the bias estimates.

A 5 mm standard deviation was achieved after 1000 epochs, i.e. less than 2 minutes for a 10 Hz receiver.

Figure 6:
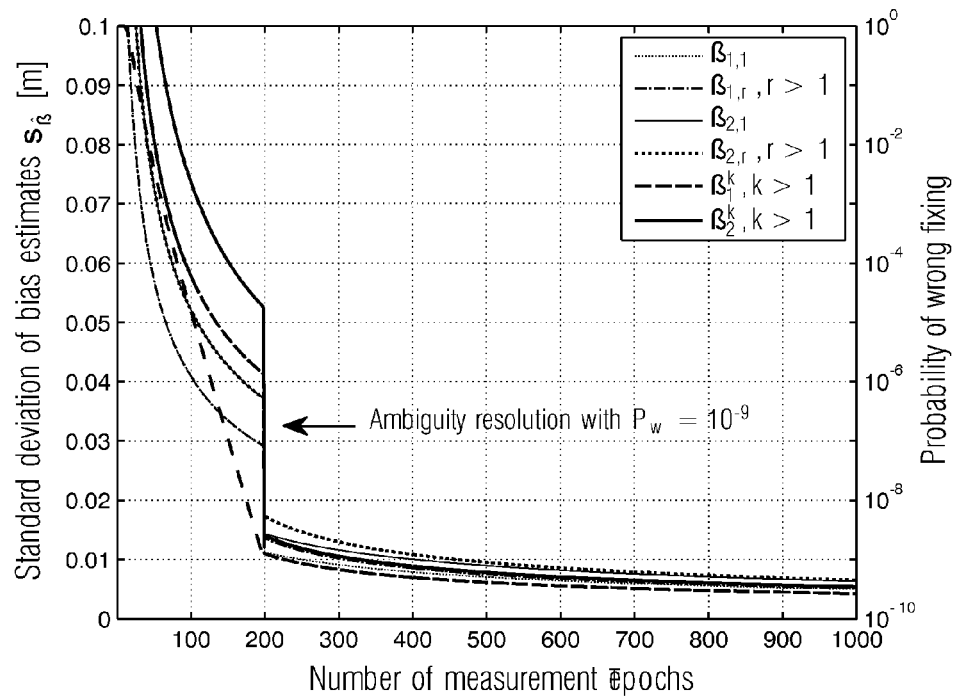
FIG. 6 shows the temporal evolution of the probability of wrong fixing and the standard deviation of the reciever and satellite bias estimates.

FIG. 6 shows the impact of the network size R on the achievable bias accuracies and illustrates the benefit of a large network of reference stations for the accuracy of the bias estimation. As long as no ambiguities are fixed, the bias estimation does not benefit from a large R as the number of ambiguities plus biases increases with KR. However, the gain in the bias estimation due to fixing depends on R and increases for larger networks due to the additional redundancy.

The bias estimation in FIG. 6 was performed in two steps: A least-squares estimation from two epochs and a Kalman filter to improve the accuracy efficiently. The float ambiguity estimates were fixed sequentially after integer decorrelation. The process noise was characterized by $S_p=1$ m and $\sigma_1=1$ cm.

The fixing of ambiguities (K=10) improves the satellite bias accuracy by a factor 4 for R=20. The estimation of E5 satellite biases with $\sigma_2^k=1$ cm requires 325 epochs for R=20, 750 epochs for R=8 and thousands epochs for R=2.

B. Benefit of Third Frequency

The accuracy of bias estimation can be further improved by using measurements on a third frequency. However, there is one major difference in the bias transformations that also affects the first Kalman filter: The code biases of the third and further frequencies have to be estimated as the range and ionospheric delay have already absorbed the code biases of the first two frequencies. The extended system of equations is given by $$\phi_{1,r}^k(t_n) = \tilde{g}_r^k(t_n) - q_{11}^2 \tilde{I}_{1,r}^k(t_n) + \lambda_1 N_{1,r}^k + \tilde{\tilde{\beta}}_{1,r} + \tilde{\beta}_1^k + \epsilon_{1,r}^k(t_n)$$

$$\phi_{2,r}^k(t_n) = \tilde{g}_r^k(t_n) - q_{12}^2 \tilde{I}_{1,r}^k(t_n) + \lambda_2 N_{2,r}^k + \tilde{\tilde{\beta}}_{2,r} + \tilde{\beta}_2^k + \epsilon_{2,r}^k(t_n)$$

$$\phi_{3,r}^k(t_n) = \tilde{g}_r^k(t_n) - q_{13}^2 \tilde{I}_{1,r}^k(t_n) + \lambda_3 N_{3,r}^k + \tilde{\tilde{\beta}}_{3,r} + \tilde{\beta}_3^k + \epsilon_{3,r}^k(t_n)$$

$$\rho_{1,r}{}^k(t_n) = \tilde{g}_r{}^k(t_n) + q_{11}{}^2 \tilde{I}_{1,r}{}^k(t_n) + \eta_{1,r}{}^k(t_n)$$

$$\rho_{2,r}{}^k(t_n) = \tilde{g}_r{}^k(t_n) + q_{12}{}^2 \tilde{I}_{1,r}{}^k(t_n) + \eta_{2,r}{}^k(t_n)$$

$$\rho_{3,r}{}^k(t_n) = \tilde{g}_r{}^k(t_n) + q_{13}{}^2 \tilde{I}_{1,r}{}^k(t_n) + \tilde{b}_{3,r} + \tilde{b}_3{}^k + \eta_{3,r}{}^k(t_n), \quad (38)$$

where $\tilde{g}_r{}^k(t_n)$, $\tilde{I}_{1,r}{}^k(t_n)$, $\tilde{\beta}_{1,r}$, $\tilde{\beta}_{2,r}$, $\tilde{\beta}_1{}^k$ and $\tilde{\beta}_2{}^5$ are given in Equations (10) and (14). The code and phase biases on the third frequency are derived similarly as $$\tilde{\beta}_{3,r} = \qquad (39)$$

$$\beta_{3,r} - b_{1,r} - \frac{1+q_{13}^2}{1-q_{12}^2} \cdot (b_{2,r} - b_{1,r}) + \beta_3^1 - b_1^1 - \frac{1+q_{13}^2}{1-q_{12}^2} \cdot (b_2^1 - b_1^1)$$

$$\tilde{b}_{3,r} = b_{3,r} - b_{1,r} - \frac{1+q_{13}^2}{1-q_{12}^2} \cdot (b_{3,r} - b_{1,r})$$

$$\tilde{\beta}_3^k = \left(\beta_3^k - b_1^k - \frac{1+q_{13}^2}{1-q_{12}^2} \cdot (b_2^k - b_1^k)\right) - \left(\beta_3^1 - b_1^1 - \frac{1+q_{13}^2}{1-q_{12}^2} \cdot (b_2^1 - b_1^1)\right) \quad (40)$$

$$\tilde{b}_3^k = \left(b_3^k - b_1^k - \frac{1-q_{13}^2}{1-q_{12}^2} \cdot (b_2^k - b_1^k)\right) - \left(b_3^1 - b_1^1 - \frac{1-q_{13}^2}{1-q_{12}^2} \cdot (b_2^1 - b_1^1)\right).$$

For M frequencies, there exist MR receiver phase biases, (M−2)R receiver code biases, M(K−1) satellite phase biases, (M−2)(K−1) satellite code biases and Ml−MR−M(K−1) integer ambiguities that are linear independent.

Figure 7:
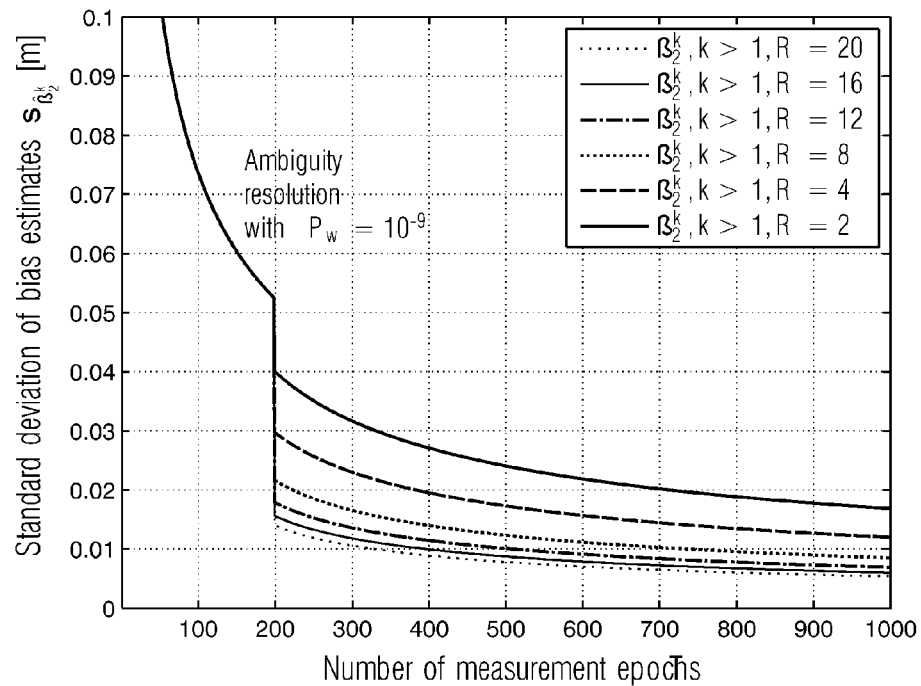
FIG. 7 demonstrates the benefit of a large networt for bias estimation.
Figure 8:
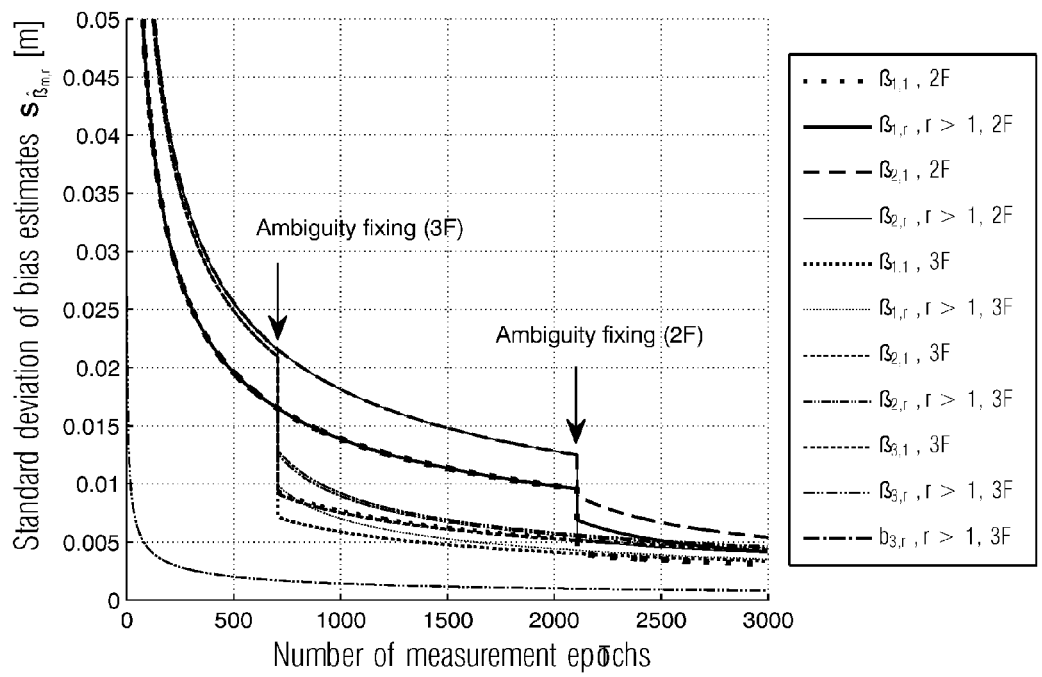
FIG. 8 demonstrates the benefit of multiple frequencies for bias estimation.

FIGS. 7 and 8 show the benefit of three (E1, E5a, E5b) frequencies for the first step of bias estimation. The additional use of E5b measurements enables a three times earlier ambiguity fixing with a probability of wrong fixing of $P_w = 10^{-9}$. This earlier fixing also reduces the uncertainty of dual frequency bias estimation by a factor of 1.7 for the receiver biases and by a factor of 2.8 for the satellite biases.

In FIGS. 7 and 8, a Kalman filter was used to estimate the ranges, range rates, ionospheric delays, receiver and satellites biases for a network of R=20 and K=10. The dual frequency case refers to E1-E5a measurements and the triple frequency case additionally includes E5b measurements. The larger number of frequencies enables an earlier ambiguity fixing with $P_w = 10^{-9}$ and, thus, more accurate receiver bias estimates.

Before fixing, the receiver phase biases can be estimated with a higher accuracy than the satellite phase biases as the MR phase measurements of the first satellite are only affected by biases of type $\beta_{m,r}$. Both the satellite phase biases and the integer ambiguities have been absorbed by $\beta_{m,r}$. On the contrary, the phase measurements of the first receiver are affected by both $\beta_{m,1}$ and $\beta_m{}^k$ which explains the slightly lower accuracy for the satellite phase bias estimates. Note that only the phase measurements with r=1 or k=1 are ambiguity-free in the transformed system of equations. The most accurate bias estimates are obtained for the code biases on the third frequency which converge to a standard deviation of 5 mm within less than 100 epochs. This high accuracy results from the unbiasedness of $\rho_{1,r}{}^k(t_n)$ and $\rho_{2,r}{}^k(t_n)$ in Equation (38) which more than compensates for the increased noise level of the code measurements.

Figure 9:
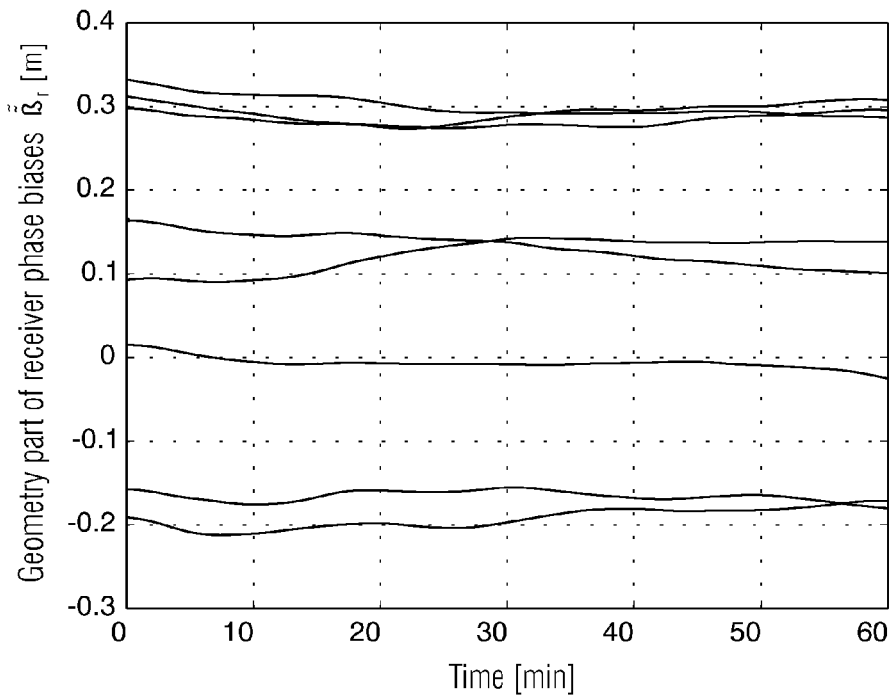
FIG. 9 is a diagram showing the temporal evolution of a geometry part of receiver phase biases.
Figure 10:
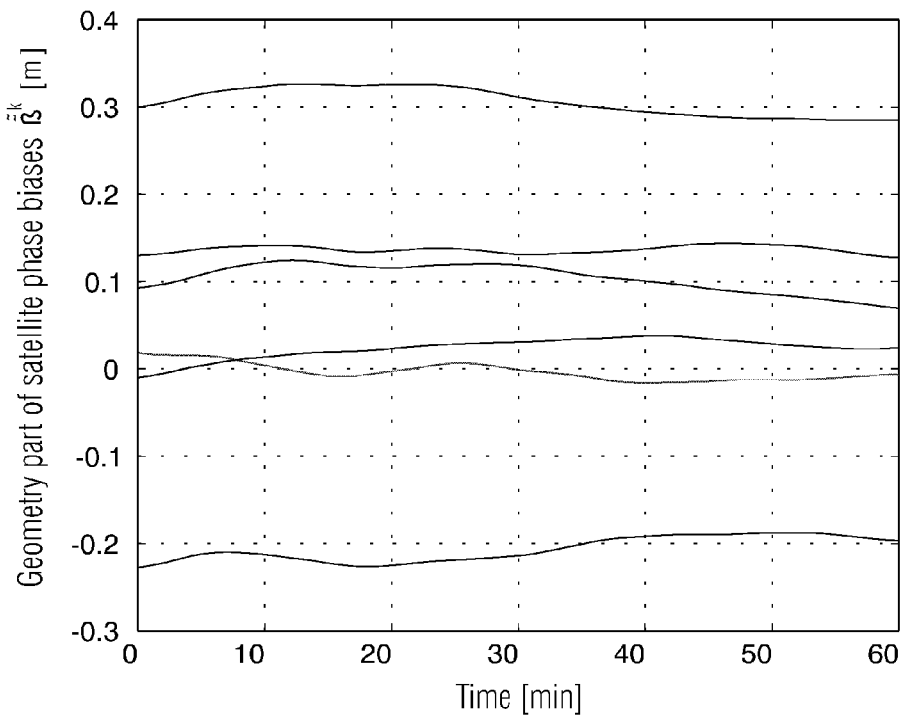
FIG. 10 is a diagram showing the temporal evolution of a geometry part of satellite phase biases.

C. Measurement Results from the Bavarian SAPOS Network of Reference Stations FIGS. 9 and 10 show the temporal evolution of the geometry part of the receiver and satellite biases, that has be determined using the Bavarian SAPOS network of reference stations. The geometry part of a bias is the bias corresponding to a ionosphere-free, geometry preserving linear combination of phase measurements. Such linear combinations are described in [11] FIGS. 9 and 10 show the geometry part of these biases, since the navigation devices 5 may use these combinations for determining their positions.

As can be recognized from FIGS. 9 and 10, the biases are relatively stable on a time scale of several minutes or even hours.

D. Estimation of Ionospheric Grid and Ionospheric Part of Receiver and Satellite Code Biases The code biases and the Grid Ionospheric Vertical Delays (=GIVD) can be estimated also without integer ambiguity resolution. In this case, it is suggested to use the code measurements on at least two frequencies and two linear combinations of time-differenced carrier phase measurements: A geometry-preserving, ionosphere-free combination which makes the range rates observable, and a geometry-free, ionosphere-preserving combination which makes the ionospheric rates observable. The measurement model is written in matrix vector notation as $$z_n = \begin{bmatrix} \rho_1(t_n) \\ \rho_2(t_n) \\ \sum_{m=1}^{M} \alpha_m \lambda_m (\varphi_m(t_{n+1}) - \varphi_m(t_n)) \\ \sum_{m=1}^{M} \gamma_m \lambda_m (\varphi_m(t_{n+1}) - \varphi_m(t_n)) \end{bmatrix} = \qquad (41)$$

$$\underbrace{\begin{bmatrix} 1 & 0 & 1 & 0 \\ 1 & 0 & q_{12}^2 & 0 \\ 0 & \Delta t & 0 & 0 \\ 0 & 0 & 0 & \Delta t \end{bmatrix}}_{H_n^{(2)}} \cdot \underbrace{\begin{bmatrix} \tilde{g}(t_n) \\ \dot{\tilde{g}}(t_n) \\ \tilde{I}(t_n) \\ \dot{\tilde{I}}(t_n) \end{bmatrix}}_{x_n} + v_n,$$

where $\alpha_m$ denote the weighing coefficients of the geometry-preserving, ionosphere-free combination and $\gamma_m$ represent the weighting coefficients of the geometry-free, ionosphere-preserving combination.

Figure 11:
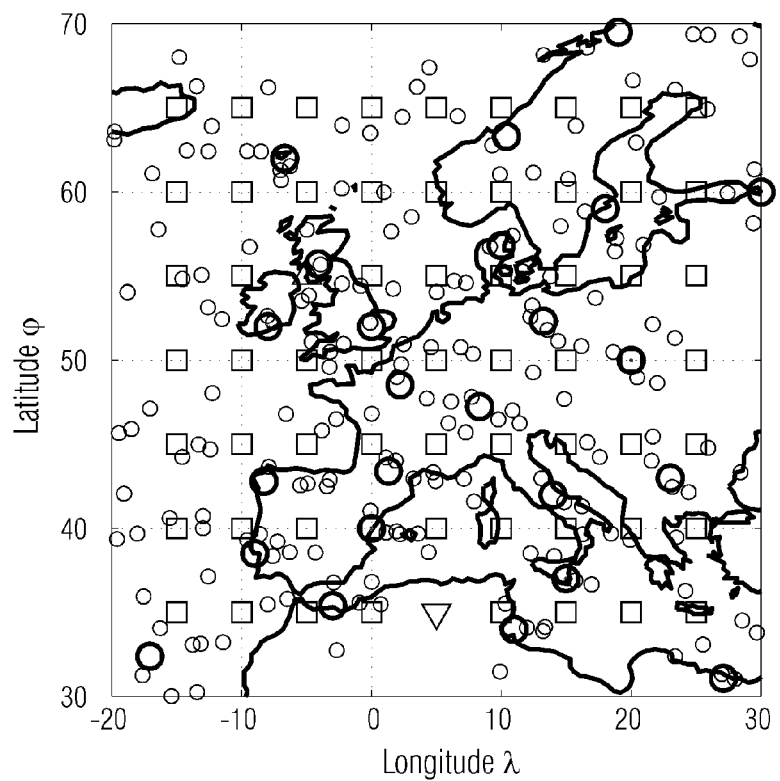

FIG. 11 shows a 5°×5° grid over Europe with the EGNOS RIMS stations (=European Geostationary Navigation Overlay—Remote Integrity Monitoring System). These stations are indicated by the bold circles [8]. The vertical ionospheric delays at the grid points represented by squares shall be determined from the slant ionospheric delays at the pierce points (normal circles). The latter ones are provided by a Kalman filter using the measurements of Equation (41).

Let the vertical ionospheric delay at the ionospheric grid point (IGP) $(\lambda^{(l)}, \phi^{(l)})$ be denoted by $i_0{}^{(l)}$, the latitudinal gradient by $i_\phi{}^{(l)}$ and the longitudinal gradient by $i_\lambda{}^{(l)}$. The ionospheric vertical delay $i_0{}^{(l)}$ at the l-th grid point is computed by a weighted least-squares fit of the slant ionospheric delays from the surrounding pierce points, i.e.

$$\min_{\substack{i_0^{(l)} \\ i_\varphi^{(l)} \\ i_\lambda^{(l)} \\ b_{I_1} \\ \vdots \\ b_{I_R} \\ b_{I^1} \\ \vdots \\ b_{I^K}}} \left\| \begin{bmatrix} \tilde{I}_1^1 \\ \vdots \\ \tilde{I}_R^K \end{bmatrix} - MH_I \begin{bmatrix} i_0^{(l)} \\ i_\varphi^{(l)} \\ i_\lambda^{(l)} \end{bmatrix} - H_b \begin{bmatrix} b_{I_1} \\ \vdots \\ b_{I_R} \\ b_{I^1} \\ \vdots \\ b_{I^K} \end{bmatrix} \right\|^2_{\Sigma^{-1}} \quad (42)$$

with the mapping matrix $$M = \begin{bmatrix} m_I(E_1^1) & & \\ & \ddots & \\ & & m_I(E_R^K) \end{bmatrix}, \quad (43)$$

the interpolation matrix $$H_I = \begin{bmatrix} 1 & \varphi_1^1 - \varphi^{(l)} & \lambda_1^1 - \lambda^{(l)} \\ \vdots & \vdots & \vdots \\ 1 & \varphi_R^K - \varphi^{(l)} & \lambda_R^K - \lambda^{(l)} \end{bmatrix}, \quad (44)$$

the bias coefficient matrix $$H_b = [1^{R \times R} \otimes 1^{K \times 1}, 1^{R \times 1} \otimes 1^{K \times K}], \quad (45)$$

and the weighting matrix $$\Sigma = \begin{bmatrix} \frac{\sin(E_1^1)}{\|x_{IPP_1^1} - x_{IGP^{(l)}}\|} & & \\ & \ddots & \\ & & \frac{\sin(E_R^K)}{\|x_{IPP_R^K} - x_{IGP^{(l)}}\|} \end{bmatrix}, \quad (46)$$

where $\varphi_r^k$ and $\lambda_r^k$ denote the latitude and longitude of the ionospheric pierce point with slant delay $\tilde{I}_r^k$, $x_{IPP_r^k}$ is the position of $IPP_r^k$ and $x_{IGP^{(l)}}$ is position of $IGP^{(l)}$.

Note that the least-squares fitting of ionospheric slant delays in Equation (42) should not use the measurements from all pierce points due to the irregular structure of the ionosphere. Typically, a bounding circle is drawn around each grid point to exclude farer points from the least-squares fitting. It has been set to 2000 km in this work. Moreover, the least-squares fitting is done jointly for all grid points as some receiver biases $b_{I_r}$ and some satellite biases $b_{I^k}$ occur in the estimation of several grid point delays.

Figure 12:
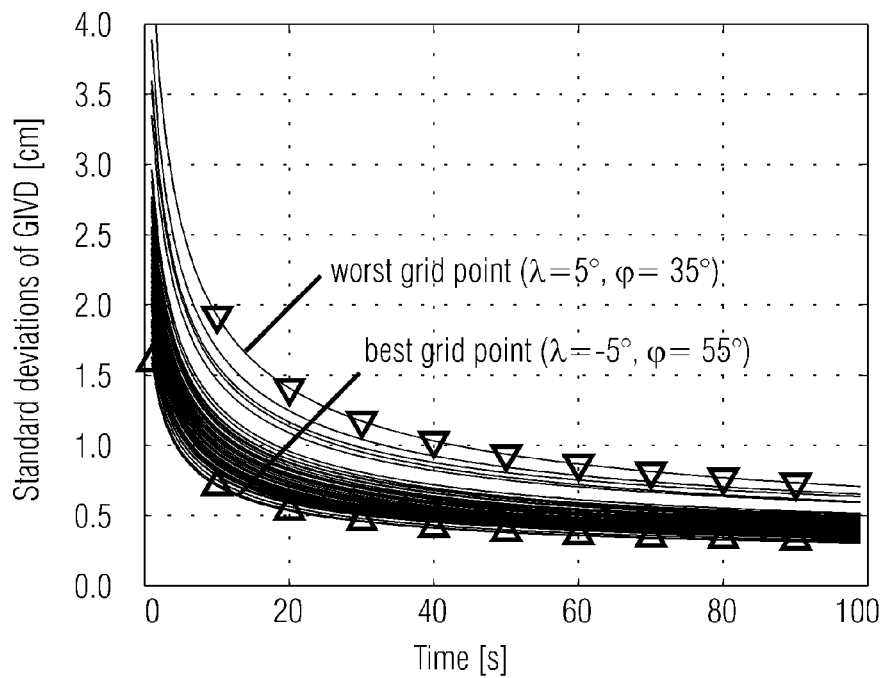
FIG. 12 depicts the achievable accuracy for the ionospheric grid.

FIG. 12 shows the achievable accuracy for the GIVDs. Obviously, this accuracy depends on the distribution of pierce points around the grid point. The most and least accurately computable vertical grid ionospheric delays are also indicated in FIG. 12.

For generating the date depicted in FIG. 12, the code measurements on E1 and E5 and two combinations of time-differenced carrier phase measurements were used in a Kalman filter to estimate the GIVD and the code biases: The first combination is geometry-preserving and ionosphere-free, and the second one is geometry-free and ionosphere-preserving which make the range rates and ionospheric rates observable respectively. A least-squares fit was used to estimate the vertical ionospheric delay for each grid point from the slant delays of the surrounding pierce points.

E. Measurements from CORS Network

The method for joint estimation of code biases and grid ionospheric vertical delays was validated with real data from six CORS stations in Vermont, USA: (1) Middlebury: $\lambda=-73.15°$, $\phi=44.00°$, (2) Montpelier: $\lambda=-72.58°$, $\phi=44.26°$, (3) Randolph Center: $\lambda=-72.60°$, $\phi=43.94°$, (4) Danby: $\lambda=-73.00°$, $\phi=43.35°$, (5) Saint Johnsbury: $\lambda=-72.03°$, $\phi=44.40°$ (6) Bradford: $\lambda=-72.11°$, $\phi=44.01°$. The maximum distance between these six stations is 140 km. The GPS L1/L2 code and carrier phase measurements of Feb. 7, 2010 have been chosen. The ionospheric grid point at $\lambda=-71°$, $\phi=43°$ is considered.

Figure 13:
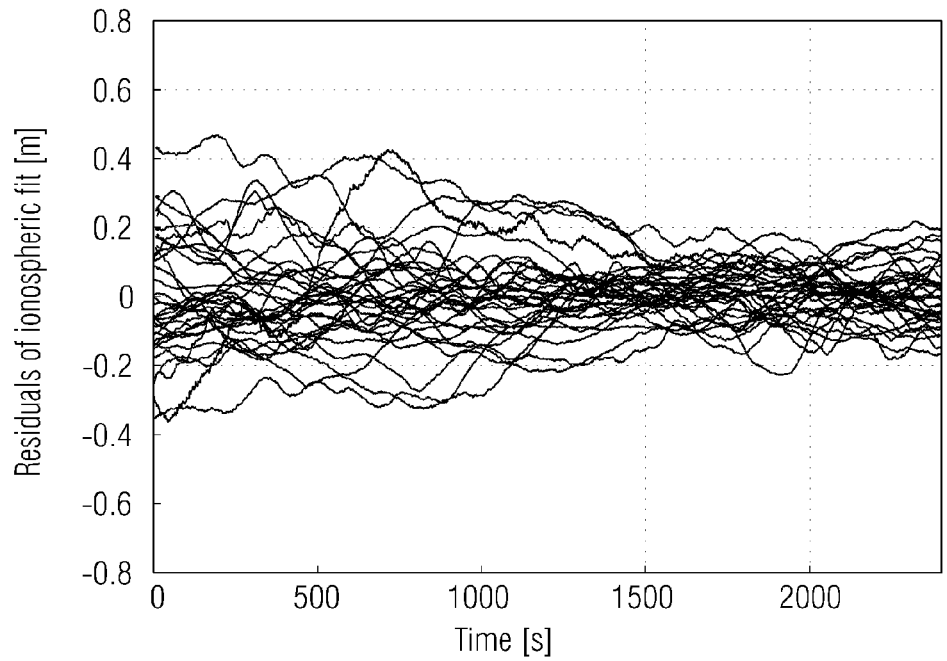
FIG. 13 shows an ionospheric grid.

FIG. 13 shows the residuals of the ionospheric slant delays which are obtained from the grid estimation of Equation (42), i.e.

$$r_I = \begin{bmatrix} \tilde{I}_1^1 \\ \vdots \\ \tilde{I}_R^K \end{bmatrix} - MH_I \begin{bmatrix} \hat{i}_0^{(l)} \\ \hat{i}_\varphi^{(l)} \\ \hat{i}_\lambda^{(l)} \end{bmatrix} - H_b \begin{bmatrix} \hat{b}_{I_1} \\ \vdots \\ \hat{b}_{I_R} \\ \hat{b}_{I^1} \\ \vdots \\ \hat{b}_{I^K} \end{bmatrix}. \quad (47)$$

Smaller residuals refer to the ionospheric pierce points that are closer to the grid point, and larger residuals can be observed for the ionospheric pierce points that are farer away. Consequently, these ionospheric residuals also indicate irregularities in the ionosphere. It is expected that a larger network improves the geometry and achievable accuracy.

It is recommended that a satellite based augmentation system transmits the bias estimates $\hat{b}_{I^k}$ in addition to the grid ionospheric vertical delays $\hat{i}_0^{(l)}$.

F. Integer Ambiguity Resolution with Bias Corrections

Figure 14:
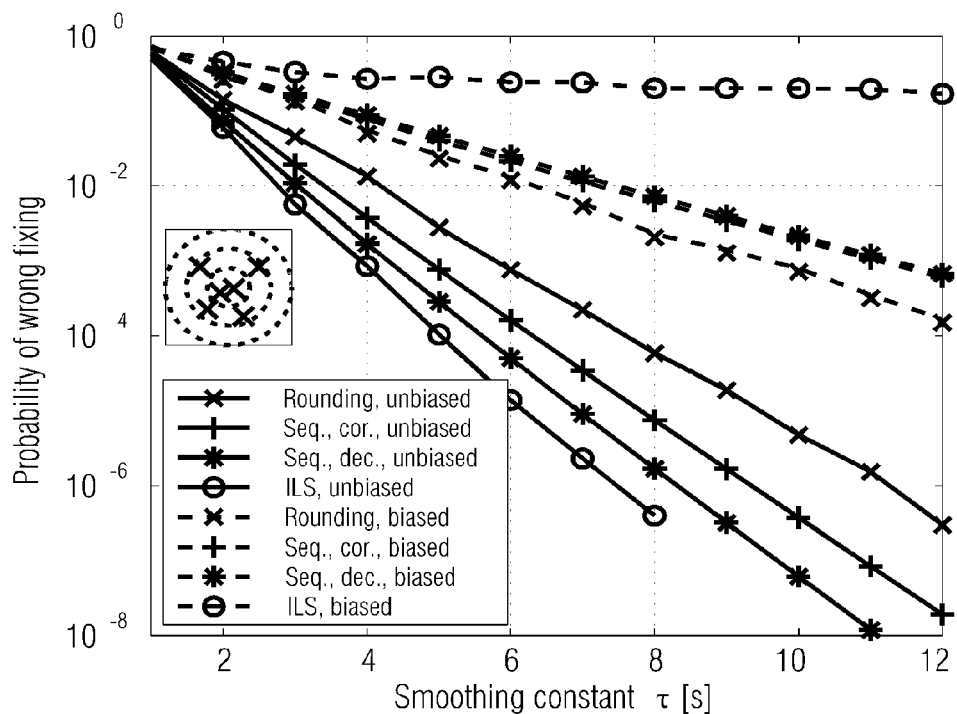
FIG. 14 demonstrates the benefit of bias estimation for ambiguity resolution.

FIG. 14 shows the benefit of bias estimation for integer ambiguity resolution. The knowledge of these biases and the use of a multi-frequency widelane combination with a wavelength of several meters enables a strong reduction of the failure rate. If biases are not estimated and corrected, a worst-case accumulation of biases over all satellites results in a poor ambiguity success rate for any of the four integer estimators: rounding, sequential fixing without or with integer decorrelation [7] and integer least-squares estimation (=ILS) as introduced by Teunissen [10]. The integer decorrelation transformation might amplify the biases which more than compensates for the gain obtained from the variance reduction and, thus, results in a lower success rate than rounding [9][7]. An elevation dependant bias profile with a maximum code bias of 1 cm in the zenith and 10 cm in the horizon, and a maximum phase bias of 0.01 cycles in the zenith and 0.1 cycles in the horizon has been assumed as in [7].

The correction of the biases results in a substantial reduction of probability of wrong fixing. In this case, integer least-squares estimation achieves the lowest probability of wrong fixing, followed by sequential fixing with and without integer decorrelation, and rounding. A probability of wrong fixing of less than $10^{-9}$ can be easily achieved by a $\tau=20$ s smoothing even for simple rounding.

CONCLUSION

In the present application, a method for bias estimation on multiple frequencies has been proposed. It is based on a Kalman filter as the large number of unknown parameters prevents a least-squares estimation. Linear dependencies between the ranges, ionospheric delays, receiver code biases, receiver phase biases, satellite code biases, satellite phase biases and integer ambiguities have been removed by a set of transformations.

A traditional least-squares estimation of phase and code biases for each receiver and satellite is infeasible and not necessary as some biases can not be separated by a network of R reference stations which monitors K satellites on M frequencies. Therefore, 2R receiver code biases and 2K satellite code biases are mapped to the ranges and ionospheric delays, M satellite phase biases are mapped to receiver phase biases, and MR receiver phase biases and M(K−1) satellite phase biases are mapped to integer ambiguities. If l denotes the number of integer ambiguities from all receivers on one frequency, then Ml−MR−M(K−1) ambiguities are kept as integers. A Kalman filter is used to estimate the ranges, range rates, ionospheric delays, the biases and the subset of integer ambiguities. Once the float ambiguities have sufficiently converged to integer numbers, an integer decorrelation transformation is applied and a sequential fixing is performed. The fixing improves the bias estimates promptly. As the receiver and satellite code biases on two frequencies are partially absorbed in the range estimates, a second Kalman filter is used to estimate the satellite positions and velocities, the tropospheric zenith delays, R weighted combinations of receiver code biases and K−1 weighted combinations of satellite code biases. Both the bias estimates from the first and second Kalman filter could then be made available by a satellite based augmentation system.

The proposed method was verified with simulated Galileo measurements from a network of 37 Galileo Sensor Stations. The simulation results show that the receiver and satellite phase biases can be estimated with an accuracy of 5 mm within a few minutes. The integer ambiguity fixing reduces the uncertainty immediately by a factor of 4 for 20 reference stations. The use of measurements on a third frequency results in a three times earlier ambiguity fixing and, thus, a substantial improvement in the bias estimation.

An increase in the size of the ground network especially improves the benefit of integer ambiguity resolution, i.e. the standard deviations of the receiver bias estimates of the first Kalman filter are substantially reduced by ambiguity fixing. The suggested bias estimation enables integer ambiguity resolution for precise point positioning within a few epochs and a probability of wrong fixing of less than $10^{-9}$.

It should be noted that the method can be implemented by a computer program product, that contains code for implementing the method described herein, if the code is executed by a processor in the reference station. In some embodiments, the computer program product may be code stored on a computer readable data carrier such as a disc, a compact disc or a digital versatile disc or the like. In other embodiments, the computer program product may also be code stored on a data storage unit on a server or an array of servers. Such a data storage unit may be a hard disc or an array of hard disc or the like. In further embodiments, the data carrier may also be an electrical carrier signal that can be used for trans-ferring the code from a server, which can be used for downloading the program code to a client.

Throughout the description and claims of this specification, the singular encompasses the plural unless the context other-wise requires. In particular, where the indefinite article is used, the specification is to be understood as contemplating plurality as well as singularity, unless the context requires otherwise.

Features, integers, characteristics, compounds or groups described in conjunction with a particular aspect, embodiment or example of the invention are to be understood to be applicable to any other aspect, embodiment or example described herein unless incompatible therewith.

TABLE 1

| | Cramer Rao Bounds for $C/N_0 = 45$ dBHz | | |
|---|---|---|---|
| | Modulation | BW [MHz] | CRB [cm] |
| E1 | MBOC | 20 | 11.14 |
| E5 | AltBOC (15, 10) | 51 | 1.95 |
| E5a | BPSK (10) | 20 | 7.83 |
| E5b | BPSK (10) | 20 | 7.83 |

REFERENCES

[1] M. Ge, G. Gendt, M. Rothacher, C. Shi and J. Liu: Resolution of GPS carrier-phase ambiguities in Precise Point Positioning (PPP) with daily observations, *Journal of Geodesy*, Springer, pp. 389-399, October 2007.

[2] M. Gabor and S. Nerem: Satellite-satellite single difference phase calibration as applied to ambiguity resolution, *Navigation*, Journal of the Institute of Navigation, vol. 49, no. 4, pp. 223-242, 2002.

[3] D. Laurichesse and F. Mercier: Integer ambiguity resolution on undifferenced GPS phase measurements and its application to PPP, *Proc. of ION-GNSS*, Forth Worth, USA, pp. 135-149, September 2007.

[4] G. Wübbena: GPS carrier phases and clock modeling, Lecture Notes in Earth Sciences: *GPS-Techniques Applied to Geodesy and Surveying*, vol. 19, pp. 381-392, DOI: 10.1007/BFb0011350, 1988.

[5] P. Henkel, V. Gomez and C. Günther: Modified LAMBDA for absolute carrier phase positioning in the presence of biases, *Proc. of Intern. Technical Meeting (ITM)*, Anaheim, USA, pp. 642-651, January 2009.

[6] R. Brown and P. Hwang: *Introduction to random signals and applied Kalman filtering*, 3rd edition, John Wiley & Sons, New York, 1997.

[7] P. Teunissen: Success Probability of Integer GPS Ambiguity Rounding and Bootstrapping, *Journal of Geodesy*, vol. 72, pp. 606-612, Springer, 1998.

[8] B. Arbesser-Rastburg: Ionospheric corrections for satellite navigation using EGNOS, Proc. of XXVII-th URSI General Assembly, Maastricht, 2002.

[9] P. Teunissen: Integer estimation in the presence of biases, *Journal of Geodesy*, vol. 75, pp. 399-407, 2001.

[10] P. Teunissen: The least-squares ambiguity decorrelation adjustment: a method for fast GPS ambiguity estimation, *Journal of Geodesy*, vol. 70, pp. 65-82, 1995.

[11] P. Henkel and C. Günther: Reliable Carrier Phase Positioning with Multi-Frequency Code Carrier Linear Combinations, *Proc. of 23rd Intern. Techn. Meet. of the Inst. of Nav.* (ION-GNSS), Portland, USA, September 2010.

What is claimed is:

1. A method for determining biases of satellite signals emitted by satellites of a satellite navigation system and received by reference stations comprising the acts:
   satellite signals of the satellites are received by a plurality of reference stations,
   systematic instrumental errors based on the satellite signals received from the satellites are determined by using a recursive state estimator, and
   while determining the systematic instrumental errors, separate, individual values for instrumental code biases and instrumental ambiguity-free phase biases of the satellites and reference stations are determined by using the recursive state estimator, which determines the biases:
   wherein the code biases and phase biases of the satellites and reference stations are determined on at least two frequencies;
   wherein in the recursive state estimator selected biases are mapped into the ranges and into the ionospheric delays, selected biases of one satellite are mapped to the biases of the reference stations, and a subset of integer ambiguities are mapped to the phase biases; and
   wherein a multi-stage recursive state estimator is used, the first stage recursive state estimator estimating ranges, range rates, ionospheric delays, unmapped biases of the reference stations and satellites, as well as ambiguities, the last stage estimating the positions of the satellites, satellite velocities, tropospheric zenith delays, as well as the unmapped biases of the reference stations and satellites, and wherein a selection of the floating ambiguities is fixed before the last stage recursive state estimator.

2. The method according to claim 1, wherein while determining the systematic instrumental errors, phase ambiguities of the satellite signals of the satellites are determined in addition to instrumental code biases and phase biases of the satellites and reference stations by using the recursive state estimator, which determines the biases and the phase ambiguities.

3. The method according to claim 1, wherein the recursive state estimator additionally determines the positions of the satellites.

4. The method according to claim 1, wherein the recursive state estimator is a dual-stage recursive state estimator.

5. The method according to claim 1, wherein in the first stage recursive state estimator, on two frequencies, the code biases are mapped into the ranges and into the ionospheric delays, the phase biases of one satellite are mapped to the phase biases of the reference stations and a subset of integer ambiguities are mapped to the phase biases.

6. The method according to claim 5, wherein, on any further frequency, the code biases are not mappable and are estimated together with the phase biases on all frequencies, on which the recursive state estimator is applied.

7. The method according to claim 5, wherein in the last stage recursive state estimator a combination of code biases, that have been absorbed in the ranges, are estimated.

8. The method according to claim 1, wherein in the first stage recursive state estimator, on two frequencies, the phase biases are mapped into the ranges and into the ionospheric delays, the code biases of one satellite are mapped to code biases of the reference stations and a subset of integer ambiguities are mapped to the code biases.

9. The method according to claim 8, wherein, on any further frequency, the phase biases are not mappable and are estimated together with the code biases on all frequencies, on which the recursive state estimator is applied.

10. The method according to claim 8, wherein in the last stage recursive state estimator a combination of phase biases, which have been absorbed in the ranges, are estimated.

11. The method according to claim 5, wherein for each reference station one integer ambiguity, and additionally for each satellite one integer ambiguity is combined with phase biases of the reference stations or satellites, wherein the combination is performed for the frequencies, on which the recursive state estimator is applied.

12. The method according to claim 1, wherein the integer ambiguities are sequentially fixed by a partial integer decorrelation, wherein the degree of decorrelation is adapted to the number of ambiguities.

13. The method according to claim 1, wherein the order of the fixing sequence is determined using a cost function, which evaluates the rounding error of a floating ambiguity and the reliability of the estimate of the floating ambiguity.

14. The method according to claim 1, wherein a grid of ionospheric vertical delays and a combination of code biases, that have been absorbed in the ionospheric delay, are estimated by the recursive state estimator.

15. The method according to claim 1, wherein the recursive state estimator is a least-square recursive state estimator.

16. The method according to claim 1, wherein the recursive state estimator is a Kalman filter.

17. A non-transitory computer-readable medium containing code for a method for determining biases of satellite signals emitted by satellites of a satellite navigation system and received by the reference station, if the code is executed on a computer having a processing unit, the method comprising the acts:
   satellite signals of the satellites are received by a plurality of reference stations,
   systematic instrumental errors based on the satellite signals received from the satellites are determined, via said processing unit, by using a recursive state estimator, and
   while determining the systematic instrumental errors, separate, individual values for instrumental code biases and instrumental ambiguity-free phase biases of the satellites and reference stations are determined, via said processing unit, by using the recursive state estimator, which determines the biases;
   wherein the code biases and phase biases of the satellites and reference stations are determined on at least two frequencies;
   wherein in the recursive state estimator selected biases are mapped into the ranges and into the ionospheric delays, selected biases of one satellite are mapped to the biases of the reference stations, and a subset of integer ambiguities are mapped to the phase biases; and
   wherein a multi-stage recursive state estimator is used, the first stage recursive state estimator estimating ranges, range rates, ionospheric delays, unmapped biases of the reference stations and satellites, as well as ambiguities, the last stage estimating the positions of the satellites, satellite velocities, tropospheric zenith delays, as well as the unmapped biases of the reference stations and satellites, and wherein a selection of the floating ambiguities is fixed before the last stage recursive state estimator.

18. A network of reference stations comprising reference stations having a signal processor arranged for performing a method for determining biases of satellite signals emitted by satellites of a satellite navigation system and received by the reference station, the method comprising the acts:

satellite signals of the satellites are received by a plurality of reference stations, systematic instrumental errors based on the satellite signals received from the satellites are determined by using a recursive state estimator, and while determining the systematic instrumental errors, separate, individual values for instrumental code biases and instrumental ambiguity-free phase biases of the satellites and reference stations are determined by using the recursive state estimator, which determines the biases;

wherein the code biases and phase biases of the satellites and reference stations are determined on at least two frequencies;

wherein in the recursive state estimator selected biases are mapped into the ranges and into the ionospheric delays, selected biases of one satellite are mapped to the biases of the reference stations, and a subset of integer ambiguities are mapped to the phase biases; and wherein a multi-stage recursive state estimator is used, the first stage recursive state estimator estimating ranges, range rates, ionospheric delays, unmapped biases of the reference stations and satellites, as well as ambiguities, the last stage estimating the positions of the satellites, satellite velocities, tropospheric zenith delays, as well as the unmapped biases of the reference stations and satellites, and wherein a selection of the floating ambiguities is fixed before the last stage recursive state estimator.

* * * * *